United States Patent

[11] 3,536,169

| [72] | Inventor | Carter H. Arnold |
| | | 317 Rocky Point Rd., Palos Verdes Estates, California 90274 |
| [21] | Appl. No. | 790,370 |
| [22] | Filed | Jan. 10, 1969 |
| [45] | Patented | Oct. 27, 1970 |

[54] LOAD BRAKE FOR UNIDIRECTIONAL OR BIDIRECTIONAL USE
11 Claims, 9 Drawing Figs.

[52] U.S. Cl. ................................................ 188/82.1, 188/82.34, 188/82.9, 192/8
[51] Int. Cl. .................................................... F16d 63/00
[50] Field of Search ........................................... 188/134, 82.1, 82.3, 82.34, 82.9; 192/7, 8; 254/(Hornsby)

[56] References Cited
UNITED STATES PATENTS

| 292,828 | 2/1884 | Lawlor | 192/7 |
| 710,759 | 10/1902 | Coleman et al. | 188/134X |
| 2,894,610 | 7/1959 | Harrington | 188/134X |
| 3,433,328 | 3/1969 | Swift | 188/218(A)UX |
| 3,433,332 | 3/1969 | Braun | 188/134 |

*Primary Examiner*—George E. A. Halvosa
*Attorney*—Gordon Wood

ABSTRACT: A brake for use with a shaft rotatably driven against a load for automatically braking rotation of the shaft when the driving means is stopped or fails. Relatively shiftable camming members are employed to apply a frictional braking force on a brake member carried by the housing in which the shaft is rotatable. Two forms of the invention are disclosed: one adapted to be used when the load on the driven shaft is unidirectional and the other when the load may be bidirectional.

Patented Oct. 27, 1970

3,536,169

INVENTOR.
CARTER H. ARNOLD
BY
Gordon Wood.
ATTORNEY

Patented Oct. 27, 1970
3,536,169
Sheet 2 of 3
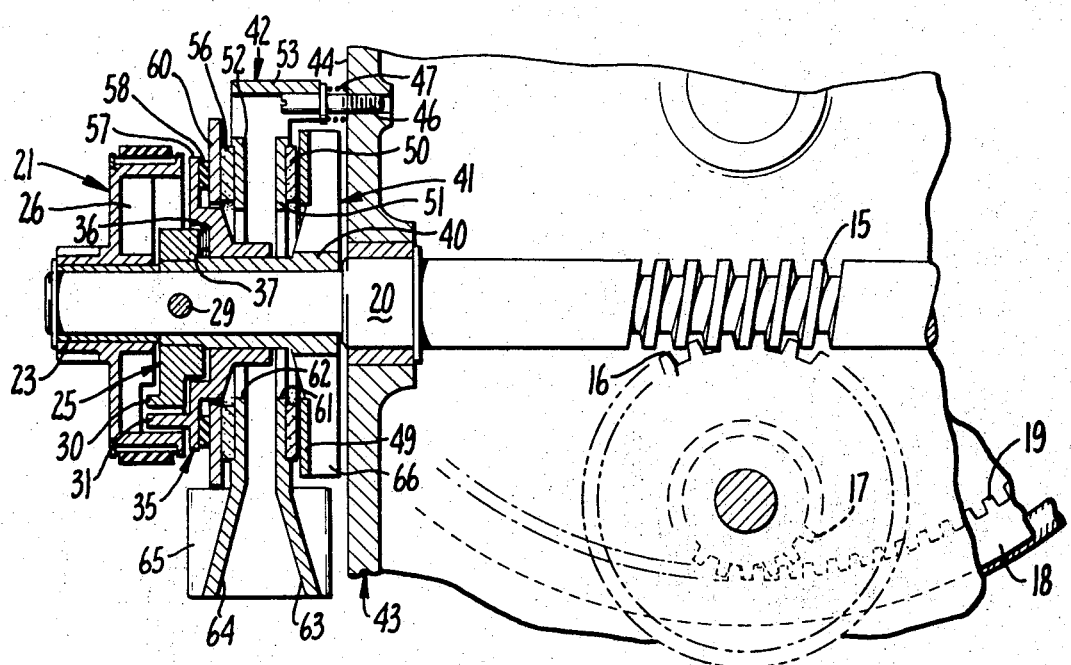
FIG.3.
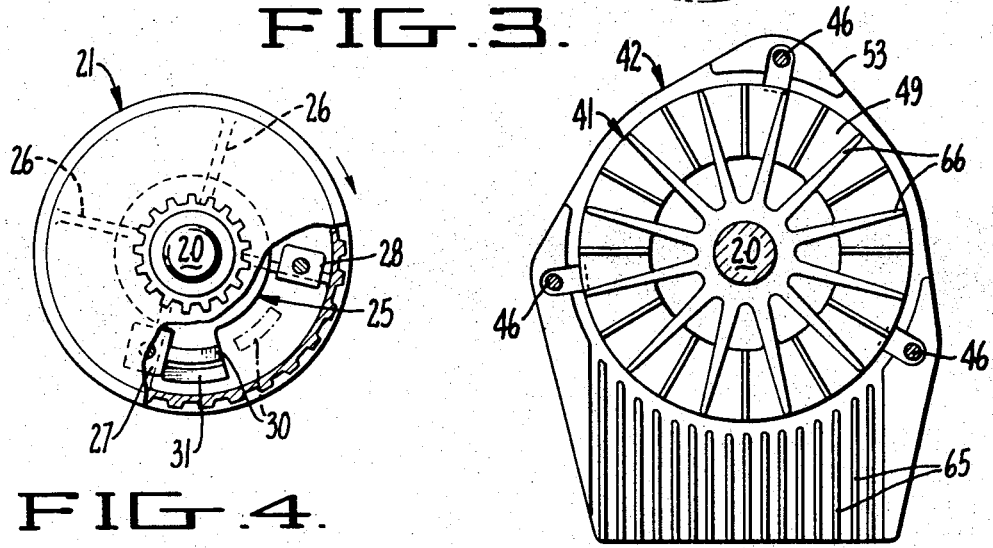
FIG.4.
FIG.5.
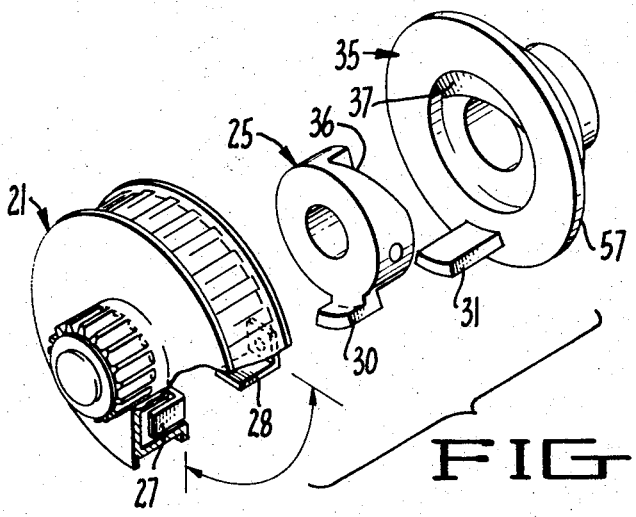
FIG.6.
INVENTOR.
CARTER H. ARNOLD
BY Gordon Wood.
ATTORNEY INVENTOR.
CARTER H. ARNOLD
BY
Gordon Wood
ATTORNEY

LOAD BRAKE FOR UNIDIRECTIONAL OR BIDIRECTIONAL USE

This invention relates to a load brake of the type which is actuated automatically by the load when the driving means for the load is stopped or fails. The present invention will be disclosed as used on the driven shaft of a hoist of the type incorporating a drum provided with a plurality of peripherally extending parallel grooves for receiving wire rope and in which hoist the rope is wound onto one end of the drum as it is wound off the other end so that the number of turns of rope always remains the same. An example of this type of hoist is shown in U.S. Pat. No. 3,063,653. However, it will be understood that the subject load brake has other applications.

Heretofore load brakes have been provided for use with a driven shaft and constructed so that as long as the shaft is being rotated against the load the brake is disengaged. However, if the driving means for rotating the driven shaft is stopped or the driving power fails, rotation of the shaft in the reverse direction under the urgency of the load automatically engages the brake and holds the shaft. Such devices generally incorporate the use of a pair of camming surfaces which cause axial shifting of brake elements when the shaft is rotated by the load but not when the shaft is rotated by the driving means.

Such prior art devices have inherent disadvantages. One is that the brake elements subjected to friction are usually rotatably mounted on the driven shaft so that the heat created by the braking action is not dissipated into the air but primarily through the shaft thus causing the latter to overheat and, in some instances, burn out the bearings which rotatably support the shaft.

Another disadvantage of prior art load brakes is that a ratchet and pawl arrangement is usually employed to hold the associated braking elements when the load tends to rotate the shaft. Such a ratchet and pawl combination is inherently noisy in normal usage when the shaft is being driven against the load.

The main object of the present invention is the provision of a load brake which overcomes many of the disadvantages of prior art load brakes having an analogous function.

Another object of the invention is the provision of a load brake incorporating a brake disk which is fixed against rotation relative to the housing in which the shaft is rotatable. By thus fixedly securing the brake disk against rotation the same may be spaced away from the shaft so that heat dissipation to the shaft by conduction is minimized.

Another object of the invention is the provision of a load brake which eliminates the usual ratchet and pawl combination of the prior art thereby increasing reliability, and which brake nevertheless retains the function of such ratchet and pawl assembly.

Still another object of the invention is the provision of a load brake which is adapted to be used in an installation wherein the driven shaft may be driven in opposite directions against a load and not merely in one direction as is the case in most load brake applications.

Other objects and advantages will be apparent from the following specification and from the drawings:

FIG. 3 is a fragmentary sectional view of a hoist showing the brake of FIG. 2 in combination with the driven shaft of the hoist.

FIG. 4 is an end elevation, partly in section, of the drive pulley.

FIG. 5 is an end elevation of the load brake as viewed from the end opposite the drive pulley.

FIG. 6 is an exploded perspective of the drive pulley and cam members illustrating the camming action.

Figure 1:
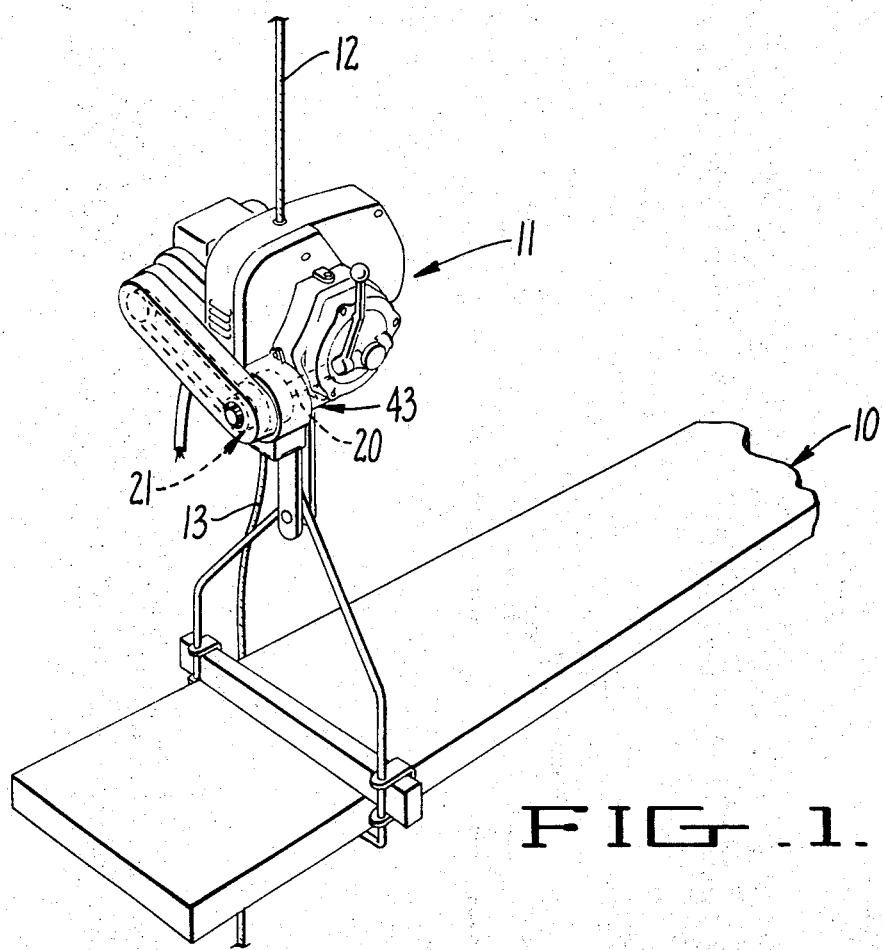
FIG. 1 is a fragmentary perspective of a hoist unit showing one example of the type of apparatus with which the invention may be employed.

One type of hoisting apparatus to which the present invention is particularly applicable is shown in FIG. 1 wherein a scaffold 10 or other load is hoisted vertically upwardly by a pair of hoists, one of which is illustrated and generally designated 11 and which may be of the type disclosed in U.S. Pat. No. 3,063,653. It will be noted that the hoist and load are supported from the loaded end 12 of the rope which is wound onto the drum of the hoist for raising the load as the unloaded or slack end 13 is wound off the drum.

Figure 2:
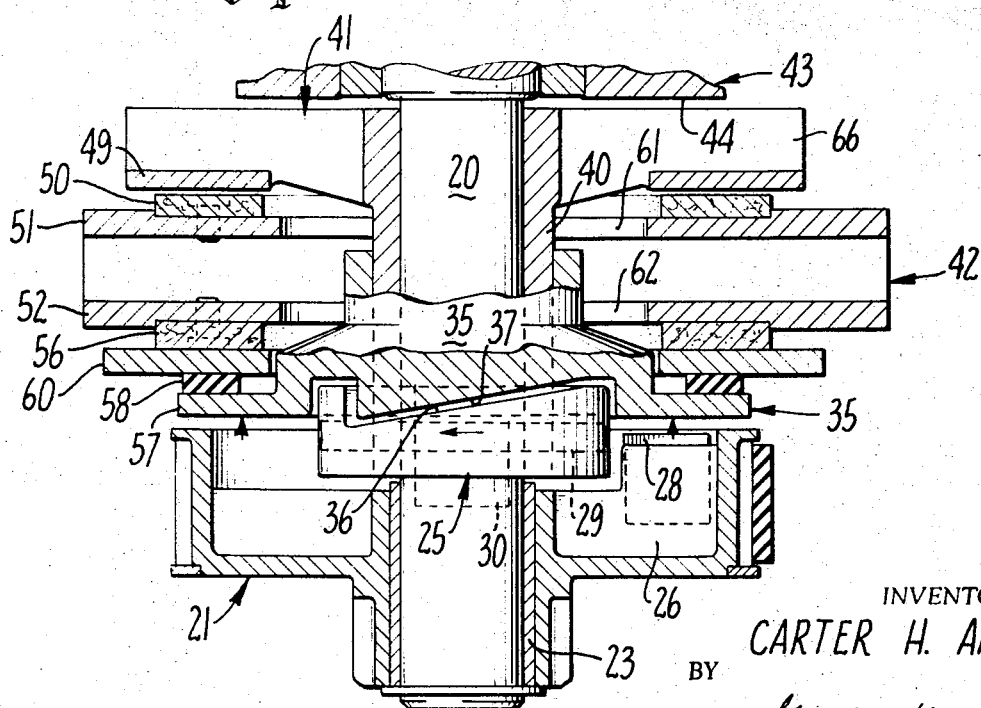
FIG. 2 is a sectional view of a load brake in accordance with the preferred form of the invention.

As best seen in FIGS. 2 and 3, the drum of the hoist is driven through a shaft 20 by means of a pulley 21 which in turn may be rotated by a flexible belt from a gear reducer or other source of power. The actual gear train can take various forms but, as indicated in FIG. 3, the shaft 20 may be provided with a worm 15 mating with a worm gear 16. The shaft of gear 16 also carries a pinion 17 which drives the rope drum 18 through an internal gear 19.

The pulley 21 is rotatably supported on a sleeve bearing 23 carried by shaft 20 and torque is transferred from pulley 21 to shaft 20 by means of a cam member 25. Pulley 21 is provided with radially extending reinforcing ribs 26 and secured to a pair of adjacent ribs are pressure pads 27, 28 formed of a suitable tough impact resistant material (FIGS. 4, 6). The pulley 21 is preferably formed by casting.

The cam member 25 is fixedly secured to shaft 20 by means of a pin 29 (FIG. 3) and said cam member 25 is provided with a driving dog 30 which is adapted to be engaged by one or the other of the pressure pads 27, 28 carried by pulley 21. At this point it will be noted, with reference to FIG. 4, that when pulley 21 is driven in a clockwise direction pressure pad 28 engages driving dog 30 on cam member 25 thus transmitting the driving torque to shaft 20. The pressure pads 27, 28 on pulley 21 are also adapted to engage a driving dog 31 which is integrally formed on a second cam member generally designated 35 and slidably supported on a sleeve 40 to be described. As seen in FIG. 4, dog 31 is radially outwardly of dog 30 on cam member 25.

Cam members 25, 35 are respectively provided with camming surfaces 36, 37 which are normally out of engagement when the shaft 20 is being driven against a load. In such a case from FIG. 4 it will be apparent that dogs 30, 31 on the cam members 25, 35 are formed so as to be simultaneously engaged by pressure pad 28 and when such simultaneous engagement exists the camming surfaces 36, 37 are spaced apart slightly (see FIG. 2). However, if the transmitting torque on pulley 21 is removed the load on shaft 20 urges the same in a counterclockwise direction causing the dog 30 to rotate to a position such as indicated in dot-dash lines in FIG. 4 and offset relative to the dog 31 on cam member 35. From FIG. 2 it will be apparent that such engagement between the two cam members 25, 35 results in the cam member 35 being urged axially of the shaft 20. Cam member 35 is slidably mounted on a sleeve portion 40 of a drive shoe generally designated 41. Both the sleeve portion 40 of drive shoe 41 and the cam member 25 are fixedly secured to shaft 20 by the above-mentioned pin 29.

It will be understood that the housing in which the shaft 20 is rotatably supported may take various forms and in FIG. 3 such housing is generally designated 43. Said housing includes a flat side 44 to which is secured a brake disk 42. Said disk 42 is secured to the housing side 44 by means of three equally space threaded pins 46 tapped into the housing side 44 (FIG. 5). Some yieldability between the disk 42 and the housing side 44 is provided by means of compression springs 47 surrounding the pins 46 and urging the disk 42 from the side 44.

The radially extending portion of the drive shoe 41 is interposed axially between the disk 42 and the side 44 of the housing 43. The drive shoe 41 is provided with an annular pressure plate or ring 49 the outer surface of which is adapted to engage a brake lining 50 carried by one sidewall 51 of the brake disk 42. A similar sidewall 52 is spaced apart from sidewall 51 to provide an air space therebetween and said sidewalls 51, 52 are connected together at their upper edges by means of top wall 53. A brake lining 56 is secured to sidewall 52 in the same manner as brake lining 50 is secured to sidewall 51.

The cam member 35 is in effect a brake shoe and is formed with an annular flange 57 to which is bonded one side of an annular cushion 58 preferably of silicone rubber or the like and a pressure ring 60 is bonded to the opposite side of cushion 58. The provision of the cushion 58 minimizes chatter when the pressure ring 60 engages the brake lining 56.

From FIGS. 2 and 3 it will be seen that as long as the pulley 21 is driving shaft 20 against the load the camming surfaces 36, 37 are separated and when the driving torque is removed from pulley 21 the camming surfaces 36, 37 engage urging the brake shoe 35 axially toward the disk 42. Since drive shoe 41 is fixed relative to shaft 20 it will be seen that the brake disk 42 is squeezed between pressure rings 49, 60 thus braking the rotation of shaft 20 and holding it stationary relative to the housing 43. If once again torque is applied to shaft 20 through drive pulley 21 in the clockwise direction (FIG. 4) the pressure pad 28 on said drive pulley engages the now offset dog 30 and urges it to the full line position of FIG. 4 wherein it is in alignment radially with the dog 31 of the camming member or shoe 35. With the dogs 30, 31 thus radially aligned the camming surfaces 36, 37 are moved out of engagement to the spaced apart position of FIG. 2 so that shaft 20 is again rotated against the load until torque is no longer transmitted through pulley 21.

The construction of brake disk 42 is extremely important and the fact that it is fixed to housing 43 against rotation relative to shaft 20 permits the disk to be formed with relatively large central openings 61, 62 in sidewalls 51, 52 so that heat is not conducted from the disk 42 to the shaft 20 and wear is eliminated. Preferably the lower ends of sidewalls 51, 52 are flared outwardly as indicated at 63, 64 (FIG. 3) to enhance the circulation of the air upwardly through the space between sidewalls 51, 52. In addition it is preferable to form said sidewalls at the flared portions 63, 64 with ribs 65 to enhance the dissipation of heat from disk 42 into the atmosphere. As seen in FIG. 5 drive shoe 41 is also preferably provided with heat dissipating ribs 66.

If it is desired to drive the load downwardly instead of upwardly after the shaft 20 has been held stationary by the brake, the pulley 21 is rotated in a counterclockwise direction (FIG. 4) so that the pressure pad 27 urges the dog 31 toward the offset dog 30 of the cam member 25. The result of this counterclockwise rotation of pulley 21 is to tend to separate the camming surfaces 36, 37 thus also tending to release the frictional load on disk 42. As this is done the brake slips and the loaded shaft tends to bring the camming surfaces 36, 37 into engagement again. The ultimate result is that a reduced frictional load is applied to the brake disk 42 and the shaft 20 is driven downwardly against such reduced frictional load on the brake. This of course promotes safety since upon removal of the driving torque on pulley 21 the brake automatically locks and holds the loaded shaft stationary relative to the housing 43.

Figure 7:
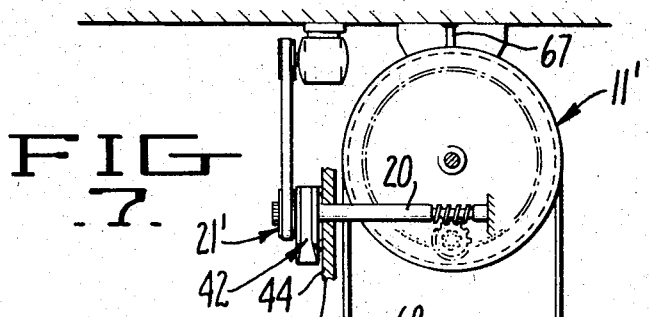
FIG. 7 is a fragmentary perspective of a hoist unit incorporating a modified form of the invention.
Figure 8:
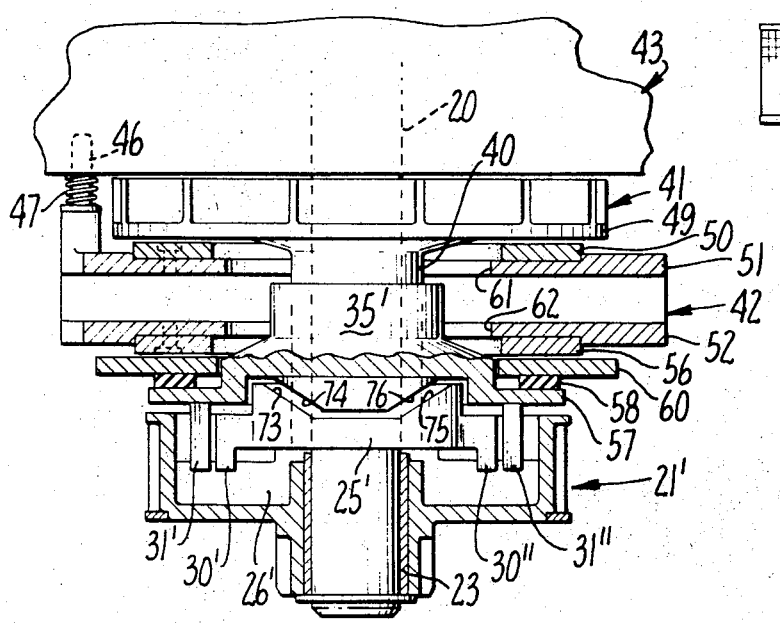
FIG. 8 is a sectional view of the modified form of load brake.
Figure 9:
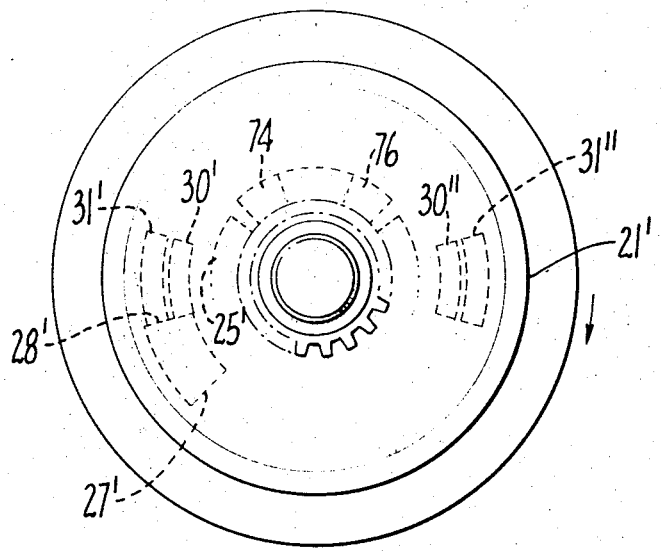
FIG. 9 is an end elevation of the load brake of FIG. 8 showing the position of the driving elements.

In FIG. 7 there is illustrated another hoisting arrangement in which the hoist 11' is supported from an elevated point by means of line 67 and the drum of the hoist supports two loaded lines 68, 69 with their loads 70, 71 respectively. This sort of application which illustrates an elevator type of arrangement may result in both lines 68, 69 being loaded or either one of them being loaded. In such a case a modified form of the invention shown in FIGS. 8, 9 is employed. In this case the elements that are identical to their counterparts in FIGS. 2 to 6 bear the same numbers. The cam member 25' is provided with two dogs 30', 30" spaced 180° apart and a pair of dogs 31'31" are positioned 180° apart on cam member 35'. A single driving abutment is formed on pulley 21' and said abutment is provided with opposite abutment surfaces 27'28'. Upon rotation of the pulley 21' in a clockwise direction the abutment surface 28' engages both dogs 30'31' and upon rotation of the pulley in a counterclockwise direction abutment surface 27' engages dogs 30"31". In this case, however, instead of one pair of camming surfaces the cam members 25'35' are provided with cooperating camming surfaces 73, 74 respectively and a second pair of cooperating camming surfaces 75, 76. The camming surfaces 73, 74 are brought into engagement upon removal of the driving torque from pulley 21' when one of the lines 68, 69 is loaded and the camming surfaces 75, 76 are brought into engagement upon removal of the driving torque if the other of the lines is loaded. In this manner it will be seen that the invention is adapted for use in a hoist wherein the load is acting on the shaft in one direction and also in those instances where the direction of the load may be reversed. The brake always holds the load against downward movement and at the same time no brake drag is present when the load is being lifted.

I claim:

1. A load brake for use with a shaft rotatable in a housing and adapted to rotate in one direction against a load:
    a driving element associated with said shaft and adapted to be rotated in said one direction for so rotating said shaft against such load;
    a first cam member separate from but engageable with said element for movement therewith;
    a second cam member rotatably supported relative to said shaft;
    said first and second cam members being provided with first and second camming surfaces respectively adapted to be engaged for shifting one of said cam members axially of said shaft upon movement of said shaft in the opposite direction; and
    a friction brake member carried by said housing and fixed against rotation relative thereto and adapted to be engaged by said axially shiftable cam member for braking movement of said shaft in said opposite direction.

2. A brake according to claim 1 wherein said cam members are provided with third and fourth camming surfaces respectively for use when the load is driven in the opposite direction.

3. A brake according to claim 1 wherein said second cam member is provided with means engageable by said driving element for relieving the pressure on said camming surfaces upon rotation of said element in said opposite direction whereby said shaft may be rotated in the opposite direction with such load thereon and against the same or reduced braking effort by said brake member.

4. A brake according to claim 3 wherein said first and second cam members are engageable with said driving element at radially spaced points relative to the axis of said shaft.

5. A brake according to claim 4 wherein said first and second cam members are provided with integral dogs simultaneously engageable by said element when said element is driven in said one direction for driving against the load.

6. A load brake for use with a shaft rotatable in a housing and adapted to rotate in one direction against a load:
    a first cam member carried by said shaft for rotation therewith;
    a second cam member rotatably supported relative to said shaft;
    a drive element rotatably supported on said shaft and separate from said first cam member and adapted to be rotated in said one direction for driving said first cam member and said shaft in said one direction;
    said cam members being provided with first and second camming surfaces respectively and adapted to be engaged for shifting said second member axially of said shaft upon movement of said shaft in the opposite direction; and
    a friction brake member carried by said housing and fixed against rotation relative to said housing and adapted to be engaged by said second cam member for braking movement of said shaft in said opposite direction.

7. A brake according to claim 6 wherein said cam members are provided with third and fourth camming surfaces respectively for use when said load is driven in the opposite direction against the load.

8. A brake according to claim 6 wherein said cam members are provided with dogs radially spaced relative to the axis of said shaft and are adapted to be engaged simultaneously by said element when the latter is driven in said one direction.

9. A brake according to claim 6 wherein all portions of said brake member are radially spaced from the periphery of said shaft and elements carried thereby to obviate wear on said shaft and inhibit heat transfer from said brake member to the remainder of the brake structure by conduction.

10. A brake according to claim 6 wherein said brake member is formed with axially spaced apart connected sidewalls to provide a radially outwardly opening air circulation space therebetween.

11. A brake according to claim 10 wherein a first brake shoe fixedly secured relative to said first cam member is adapted to engage one of said sidewalls and a second brake shoe carried by said second cam member is adapted to engage said second sidewall.